US008459031B2

(12) United States Patent
Kalina (10) Patent No.: US 8,459,031 B2
(45) Date of Patent: Jun. 11, 2013

(54) DIRECT CONTACT HEAT EXCHANGER AND METHODS FOR MAKING AND USING SAME

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 904 days.

(21) Appl. No.: 12/562,639

(22) Filed: Sep. 18, 2009

(65) Prior Publication Data
US 2011/0067400 A1    Mar. 24, 2011

(51) Int. Cl.
*F01K 25/06* (2006.01)
(52) U.S. Cl.
USPC ............ 60/649; 60/651; 60/671; 60/673

(58) Field of Classification Search
USPC ............... 60/649, 651, 653, 671, 673
See application file for complete search history.

(56) References Cited

U.S. PATENT DOCUMENTS

| 4,099,384 | A  | * | 7/1978  | Stevens et al. | 60/657 |
| 4,691,523 | A  | * | 9/1987  | Rosado         | 60/649 |
| 6,158,221 | A  | * | 12/2000 | Fancher et al. | 60/649 |
| 6,715,290 | B1 | * | 4/2004  | Erickson       | 60/671 |
| 7,458,218 | B2 | * | 12/2008 | Kalina         | 60/649 |

* cited by examiner

*Primary Examiner* — Hoang Nguyen
(74) *Attorney, Agent, or Firm* — Robert W. Strozier (57) ABSTRACT

A system and method are disclosed for the combined production of power and heat from an external heat source stream, where the system utilizes four basic stream of different compositions to co-generate power and to heat an external heat absorber stream from an external heat source stream.

20 Claims, 3 Drawing Sheets

DIRECT CONTACT HEAT EXCHANGER AND METHODS FOR MAKING AND USING SAME

BACKGROUND OF THE INVENTION

1. Field of the Invention

Embodiments of the present invention relates to power generation systems with simultaneous production of electrical power and heat.

More particularly, embodiments of the present invention relates to power generation system that simultaneously produce electric power and heat, where the system includes a heat conversion subsystem HCSS, a vaporization subsystem VSS, a heat exchange and separation subsystem HESS, a heat transfer and separation subsystem HTSS, a heat utilization subsystem HUSS and a condensation subsystem CSS. The HUSS can be any subsystem that can utilized waste heat such as a factory, an refinery, an office building for heating, heating for homes, cities, towns, subdivisions or any other subsystem that can utilize a ready heat source of a low to moderate temperature.

2. Description of the Related Art

In U.S. Pat. Nos. 5,095,708, and 5,572,871, power systems were presented that were designed to serve as bottoming cycles for combined cycle systems. These systems both had a specific feature which was the key to their high efficiency; both systems used intercooling of the working fluid in between turbine stages. Because the heat released during intercooling was recuperated, it was then used as an additional source of heating for the process of vaporization. This resulted in a drastic increase in the thermodynamical reversibility and correspondingly in higher efficiency of the power cycle.

However, in the prior art, this process of intercooling was performed in a special heat exchanger, a so-called "intercooler." Such an intercooler requires that the streams of working fluid in both the tubes and the shell of the intercooler be at high pressure. Moreover, the intercooled stream in the prior art is in the form of a vapor, and therefore the heat transfer coefficient from the vapor to the intercooler tubes is low. As a result, such an intercooler must be a very large and very expensive high pressure heat exchanger. This in turn has a very negative impact on the economics of the entire system.

Thus, there is a need in the art for a system designed to utilize high to medium temperatures sources in small to medium power plants to co-generate electrical power or other useable form of energy and heat for heating an external heat absorber stream, where the external heat absorber stream can be used to heat streams in other process or to heat towns, cities, offices, factories or the like.

SUMMARY OF THE INVENTION

The present invention provides a system for the co-generation of a useable form of energy and useable thermal energy, i.e., the co-production of electrical power and useable heat, from high to medium temperature heat source streams, where the system includes a heat conversion subsystem HCSS, a vaporization subsystem VSS, a heat exchange and separation subsystem HESS, a heat transfer and separation subsystem HTSS, a heat utilization subsystem HUSS and a condensation subsystem CSS. The HUSS can be any subsystem that can utilized waste heat such as a factory, an refinery, an office building for heating, heating for homes, cities, towns, subdivisions or any other subsystem that can utilize a ready heat source of a low to moderate temperature.

The present invention provides A method for co-production of energy and heat including converting a portion of heat from a fully vaporized and superheated working solution stream to electrical power comprising the co-generated energy to form a spent working solution stream. The method further includes superheating a vapor portion of a mixed phase working solution stream and simultaneously fully vaporizing and superheating a liquid portion of the mixed phase working solution stream a heat recovery vapor generator to form a fully vaporized and superheated vapor portion of the working solution stream and a fully vaporized and superheated liquid portion of the working solution stream. The method further includes combining a fully vaporized and superheated vapor portion of the working solution stream and a fully vaporized and superheated liquid portion of the working solution stream to form the fully vaporized and superheated working solution stream. The method further includes heating a heated rich solution stream and a heated first lean solution substream with heat from the spent working solution stream to form a partially to fully vaporized rich solution stream and a partially vaporized lean solution substream and a cooled spent working solution stream. The method further includes combining the partially to fully vaporized rich solution stream and the partially vaporized lean solution substream into a mixed phase working solution stream. The method further includes separating the mixed phase working solution stream into the vapor portion of the mixed phase working solution stream and the liquid portion of the mixed phase working solution stream. The method further includes combining the cooled spent working solution stream with a pressurized pressure second lean solution stream to form a condensing solution stream. The method further includes heating a pressurized rich solution stream, a pressurized first lean solution substream and an external heat absorber stream with heat from the condensing solution stream to form the heated rich solution stream, the heated first lean solution substream, a heated external heat absorber stream and a mixed phase condensing solution stream, where the heated external heat absorber stream comprises the co-generated heat. The method further includes separating the mixed phase condensing solution stream into a vapor stream and a lean solution stream. The method further includes dividing the lean solution stream into a first lean solution substream, a second lean solution substream, and a third lean solution substream. The method further includes raising a pressure of the first lean solution substream to form the pressurized first lean solution substream, a pressure of the second lean solution substream to form the pressurized to form the higher pressure second lean working fluid stream. The method further includes combining the vapor stream and the third lean solution substream to form a rich solution stream. The method further includes condensing the rich solution stream with an external coolant stream to form a fully condensed rich solution stream. The method further includes raising a pressure of the fully condensed rich solution stream to form the pressurized rich solution stream. The working solution streams, the condensing solution streams, the lean solution streams and the rich solution streams are different composition of a multi-component fluid including at least one lower boiling point component and at least one higher boiling point component.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventor has found that a system can be constructed for the simultaneous conversion of a portion of an external heat source stream into a useable form of energy and production of heat for transfer to an external heat absorption stream.

The systems is designed for the simultaneous production of electrical power and heat. The assumption of this description is that heat is produced in the form of hot water, but as will be made clear from the description, the heat produced can be used in other ways as well.

The systems of this invention include a plurality of heat exchanges units, a plurality of separators, a plurality of pumps, a plurality of stream mixing valves, a plurality of stream splitting valves, a heat recovery and vapor generator unit, and at least one turbine. The stream splitting valves are control valves that are used to adjust or control the amount of a stream flowing into one or more substreams as is will known in the prior art.

The systems and methods of this invention utilize four basic internal stream compositions of a multi-component fluid: a rich solution composition, a lean solution composition, a condensing solution composition and a working solution composition. The working solution stream is fully vaporized and superheated and a portion of its thermal energy is converted to a useable form of energy such as electric energy in the form of electric power. The lean solution stream is formed in a separator from a cooled condensing solution stream. The lean solution stream is divided into three lean solution substream. The first lean solution stream is first pressurized, then heated using heat from condensing solution substreams. The second lean solution stream is pressurized and mixed with a cooled spent working solution stream to from the condensing solution stream. The rich solution is formed from a vapor portion of the condensing solution stream and a portion of the lean solution stream and is then fully condensed using an external coolant stream, which can be pressurized to insure complete condensation of the rich solution stream. The fully condensed rich solution stream is pressurized and then heat using heat from condensing solution substream. The heated rich solution stream and the heated first lean solution substream are then separating vaporized or partially vaporized combined to form the working solution stream using heat from two spent working solution substreams. The working solution stream is then separated into a vapor portion and a liquid portion, and separately superheated or fully vaporized and superheated and combined to form the fully vaporized and superheated working solution stream. A portion of the heat in the condensing solution stream is separately used to heat an external heat absorber stream for the co-production of useable thermal energy.

In the present invention, the heat source stream can be a geothermal heat source stream, a heat source stream from an internal combustion engine, or any other heat source stream.

Embodiments of the system of this invention for co-generation of power and heat includes a heat conversion subsystem HCSS comprising at least one turbine, where a portion of heat of a fully vaporized and superheated working solution stream is converted to a useable form of energy or power to form a spent working solution stream.

The system further includes a vaporization subsystem VSS comprising a heat recovery and vapor generator HRVG and a mixing valve, where a vapor portion of a partially vaporized working solution substream is superheated and a liquid portion of the partially vaporized working solution substream is fully vaporized and superheated in the HRVG using heat derived from an external heat source stream and where the two superheated substreams are combined in the mixing valve to form the fully vaporized and superheated working solution stream.

The system further includes a heat exchange and separation subsystem HESS comprising a plurality of HESS heat exchange units, a HESS separator, and a plurality of valves, where the spent working solution stream is divided in a splitting valve into two spent working solution substreams, where a heated rich solution stream and a heated first lean solution substream are separately vaporized or partially vaporized in separate HESS heat exchange units using heat from the two spent working solution substreams to form a partially to fully vaporized rich solution stream, a partially vaporized first lean solution substream, and two cooled spent working solution substreams, where the two cooled spent working solution substreams are combined in a mixing valve to form a cooled spent working solution stream, where the partially to fully vaporized rich solution stream and the partially vaporized first lean solution substream are combined in a mixing value to form a mixed phase working solution steam, where the mixed phase working solution stream is separated in the HESS separator into the vapor portion of the partially vaporized working solution stream and the liquid portion of the partially vaporized working solution stream.

The system further includes a heat transfer and separation subsystem HTSS comprising a plurality of HTSS heat exchange units, a HTSS separator, a plurality of pumps and a plurality of valves, where the cooled spent working solution stream is combined in a mixing valve with a second lean solution substream to form a condensing solution stream, where the condensing solution stream is divided into three condensing solution substreams in a splitting valve, where two of the condensing solution substreams are used to separately preheat and heat a pressurized first lean solution substream and to preheat and heat a pressurized fully condensed rich solution stream in the HTSS heat exchange units to form the heated rich solution substream and heated first lean solution substream and three mixed phase condensing solution substreams, where the three mixed phase condensing solution substreams are combined in a mixing valve to form a mixed phase condensing solution stream, where the mixed phase condensing solution stream is separated into a vapor stream and a lean solution stream and where the lean solution stream is divided into a first lean solution substream, a second lean solution substream and a third lean solution substream, where the first lean solution substream is passed through a pump to form a pressurized first lean solution stream, where the second lean solution substream is pass through a pump to form a pressurized second lean solution stream, and where the third lean solution substream is combined with the vapor stream to from a rich solution stream.

The system further includes a heat utilization subsystem HUSS comprising at least one heat exchange unit, where the third condensing solution substream is used to preheat and heat an external heat absorber stream to form a heated external heat absorber stream and where the heated external heat absorber stream supplies heat to an external process, unit or facility.

The system further includes a condensation subsystem CSS comprising a condenser unit and two pumps, where the condenser fully condenses the rich solution stream to form a fully condensed rich solution stream and where the fully condensed rich solution stream is pressurized in a rich solution pump to form the pressurized fully condensed rich solution stream using a pressurized external coolant stream formed from passing an external coolant stream through a pump.

The working solution streams, the condensing solution streams, the lean solution streams and the rich solution streams are different composition of a multi-component fluid including at least one lower boiling point component and at least one higher boiling point component.

The multi-component fluid comprises a mixture of any number of compounds having different boiling points and having favorable thermodynamic characteristics and solubilities. The multi-component fluid is selected from the group consisting of an ammonia-water mixture, a mixture of two or more hydrocarbons, a mixture of two or more freons, a mixture of hydrocarbons and freons, or similar fluid having two or more components having different boiling points.

The multi-component fluid comprises a mixture of water and ammonia.

The heat absorber fluids is selected from the group consisting of water, air, heat transfer fluids, synthetic or naturally derived hydrocarbon heat transfer fluids, silicon heat transfer fluids or any other heat transfer fluid suitable for use in the present invention.

The plurality of HESS heat exchange units is two, where one HESS heat exchange unit is used to partially vaporizes the heated first lean solution substream and the second HESS heat exchange unit is used to fully or partially vaporizes heated rich solution stream.

The plurality of HTSS heat exchange units is four, where two of the HTSS heat exchange units preheat and heat the pressurized first lean solution substream and two of the HTSS heat exchange units preheat and heat the pressurized rich solution stream.

The plurality of HUSS heat exchange units is two, where one HUSS heat exchange unit is used to preheat the external heat absorber stream and the second HUSS heat exchange unit is used to heat the preheated external heat absorber stream.

Embodiments of the system of this invention for co-generation of power and heat includes a heat conversion subsystem HCSS comprising at least one turbine, where a portion of heat of a fully vaporized and superheated working solution stream is converted to a useable form of energy or power to form a spent working solution stream.

The system further includes a vaporization subsystem VSS comprising a heat recovery and vapor generator HRVG and a mixing valve, where a vapor portion of a partially vaporized working solution substream is superheated and a liquid portion of the partially vaporized working solution substream is fully vaporized and superheated in the HRVG using heat derived from an external heat source stream and where the two superheated substreams are combined in the mixing valve to form the fully vaporized and superheated working solution stream.

The system further includes a heat exchange and separation subsystem HESS comprising a plurality of HESS heat exchange units, a HESS separator, and a plurality of valves, where the spent working solution stream is divided in a splitting valve into two spent working solution substreams, where a heated rich solution stream and a heated first lean solution substream are separately vaporized or partially vaporized in separate HESS heat exchange units using heat from the two spent working solution substreams to form a partially to fully vaporized rich solution stream, a partially vaporized first lean solution substream, and two cooled spent working solution substreams, where the two cooled spent working solution substreams are combined in a mixing valve to form a cooled spent working solution stream, where the partially to fully vaporized rich solution stream and the partially vaporized first lean solution substream are combined in a mixing value to form a mixed phase working solution steam, where the mixed phase working solution stream is separated in the HESS separator into the vapor portion of the partially vaporized working solution stream and the liquid portion of the partially vaporized working solution stream;

The system further includes a heat transfer and separation subsystem HTSS comprising a plurality of HTSS heat exchange units, a HTSS separator, a plurality of pumps and a plurality of valves, where the cooled spent working solution stream is combined in a mixing valve with a second lean solution substream to form a condensing solution stream, where the condensing solution stream is divided into three condensing solution substreams in a splitting valve, where two of the condensing solution substreams are used to separately heat a preheated first lean solution substream and a preheated rich solution stream in two of the HTSS heat exchange units to form the heated rich solution substream and heated first lean solution substream and two cooler condensing solution substream, where the three cooler condensing solution substreams are combined in a mixing valve to bring the stream into a common state and then separated in a splitting valve into three cooler condensing solution substreams, where two of the cooler condensing solution substreams are used to preheat a pressurized fully condensed rich solution stream and a pressurized first lean solution substream to form the preheated rich solution substream and preheated first lean solution substream to form two mixed phase condensing stream, where the three mixed phase condensing solution substreams are combined in a mixing valve to form a mixed phase condensing solution stream, where the mixed phase condensing solution stream is separated into a vapor stream and a lean solution stream and where the lean solution stream is divided in a splitting valve into a first lean solution substream, a second lean solution substream and a third lean solution substream, where the first lean solution substream is passed through a pump to form a pressurized first lean solution stream, where the second lean solution substream is pass through a pump to form a pressurized second lean solution stream, and where the third lean solution substream is combined with the vapor stream to from a rich solution stream.

The system further includes a heat utilization subsystem HUSS comprising at least one HUSS heat exchange unit, where the third cooler condensing solution substream is used to preheat an external heat absorber stream in the HUSS heat exchange unit to form a preheated external heat absorber stream, where the third condensing solution substream is used to heat the preheated external heat absorber stream and where the heated external heat absorber stream supplies heat to an external process, unit or facility.

The system further includes a condensation subsystem CSS comprising a condenser unit and two pumps, where the condenser fully condenses the rich solution stream to form a fully condensed rich solution stream and where the fully condensed rich solution stream is pressurized in a rich solution pump to form the pressurized fully condensed rich solution stream using a pressurized external coolant stream formed by passing an external coolant stream through a coolant pump.

The working solution streams, the condensing solution streams, the lean solution streams and the rich solution streams are different composition of a multi-component fluid including at least one lower boiling point component and at least one higher boiling point component.

The multi-component fluid comprises a mixture of any number of compounds having different boiling points and having favorable thermodynamic characteristics and solubilities.

The multi-component fluid is selected from the group consisting of an ammonia-water mixture, a mixture of two or more hydrocarbons, a mixture of two or more freons, a mixture of hydrocarbons and freons, or similar fluid having two or more components having different boiling points.

The multi-component fluid comprises a mixture of water and ammonia.

The heat absorber fluids is selected from the group consisting of water, air, heat transfer fluids, synthetic or naturally derived hydrocarbon heat transfer fluids, silicon heat transfer fluids or any other heat transfer fluid suitable for use in the present invention.

The plurality of HESS heat exchange units is two, where one HESS heat exchange unit is used to partially vaporizes the heated first lean solution substream and the second HESS heat exchange unit is used to fully or partially vaporizes heated rich solution stream.

The plurality of HTSS heat exchange units is four, where two of the HTSS heat exchange units preheat and heat the pressurized first lean solution substream and two of the HTSS heat exchange units preheat and heat the pressurized rich solution stream.

The plurality of HUSS heat exchange units is two, where one HUSS heat exchange unit is used to preheat the external heat absorber stream and the second HUSS heat exchange unit is used to heat the preheated external heat absorber stream.

Embodiments of this method for co-production of energy and heat includes converting a portion of heat from a fully vaporized and superheated working solution stream to electrical power comprising the co-generated energy to form a spent working solution stream.

The method further includes superheating a vapor portion of a mixed phase working solution stream and simultaneously fully vaporizing and superheating a liquid portion of the mixed phase working solution stream a heat recovery vapor generator to form a fully vaporized and superheated vapor portion of the working solution stream and a fully vaporized and superheated liquid portion of the working solution stream.

The method further includes combining a fully vaporized and superheated vapor portion of the working solution stream and a fully vaporized and superheated liquid portion of the working solution stream to form the fully vaporized and superheated working solution stream.

The method further includes heating a heated rich solution stream and a heated first lean solution substream with heat from the spent working solution stream to form a partially to fully vaporized rich solution stream and a partially vaporized lean solution substream and a cooled spent working solution stream.

The method further includes combining the partially to fully vaporized rich solution stream and the partially vaporized lean solution substream into a mixed phase working solution stream.

The method further includes separating the mixed phase working solution stream into the vapor portion of the mixed phase working solution stream and the liquid portion of the mixed phase working solution stream.

The method further includes combining the cooled spent working solution stream with a pressurized pressure second lean solution stream to form a condensing solution stream.

The method further includes heating a pressurized rich solution stream, a pressurized first lean solution substream and an external heat absorber stream with heat from the condensing solution stream to form the heated rich solution stream, the heated first lean solution substream, a heated external heat absorber stream and a mixed phase condensing solution stream, where the heated external heat absorber stream comprises the co-generated heat.

The method further includes separating the mixed phase condensing solution stream into a vapor stream and a lean solution stream.

The method further includes dividing the lean solution stream into a first lean solution substream, a second lean solution substream, and a third lean solution substream.

The method further includes raising a pressure of the first lean solution substream to form the pressurized first lean solution substream, a pressure of the second lean solution substream to form the pressurized to form the higher pressure second lean working fluid stream.

The method further includes combining the vapor stream and the third lean solution substream to form a rich solution stream.

The method further includes condensing the rich solution stream with an external coolant stream to form a fully condensed rich solution stream.

The method further includes raising a pressure of the fully condensed rich solution stream to form the pressurized rich solution stream.

The working solution streams, the condensing solution streams, the lean solution streams and the rich solution streams are different composition of a multi-component fluid including at least one lower boiling point component and at least one higher boiling point component.

The multi-component fluid comprises a mixture of any number of compounds having different boiling points and having favorable thermodynamic characteristics and solubilities.

The multi-component fluid is selected from the group consisting of an ammonia-water mixture, a mixture of two or more hydrocarbons, a mixture of two or more freons, a mixture of hydrocarbons and freons, or similar fluid having two or more components having different boiling points and wherein the heat absorber fluids is selected from the group consisting of water, air, heat transfer fluids, synthetic or naturally derived hydrocarbon heat transfer fluids, silicon heat transfer fluids or any other heat transfer fluid suitable for use in the present invention.

The multi-component fluid comprises a mixture of water and ammonia.

Suitable Reagents and Equipment of this Invention

Suitable multi-component working fluid for use in the systems of this inventions include, without limitation, any fluid that comprises at least one lower boiling point material—the low boiling component—and at least one higher boiling point material—the high boiling component. In certain embodiments, the multi-component working fluids include, without limitation, an ammonia-water mixture, a mixture of two or more hydrocarbons, a mixture of two or more freons, a mixture of hydrocarbons and freons, or similar fluid having two or more components having different boiling points. In general, the fluid can comprise a mixture of any number of compounds having different boiling points and having favorable thermodynamic characteristics and solubilities. In a certain embodiments, the multi-component working fluid comprises a mixture of water and ammonia.

Suitable heat absorber fluids include, without limitation, water, air, heat transfer fluids, synthetic or naturally derived hydrocarbon heat transfer fluids, silicon heat transfer fluids or any other heat transfer fluid suitable for use in the present invention.

Suitable heat exchange units include, without limitation, any heat exchange apparatus that permits heat to flow from a higher temperature fluid to a lower temperature fluid in a counter-flow arrangement.

Suitable mixing and splitting valve include, without limitation, any mixing or splitting valves that can combine or divide stream, respectively, where the splitting valves can control the amount quantity of fluid going to the different substream either by control means or by initial design.

DETAILED DESCRIPTION OF THE DRAWINGS
OF THE INVENTION

Entire Systems

Figure 1:
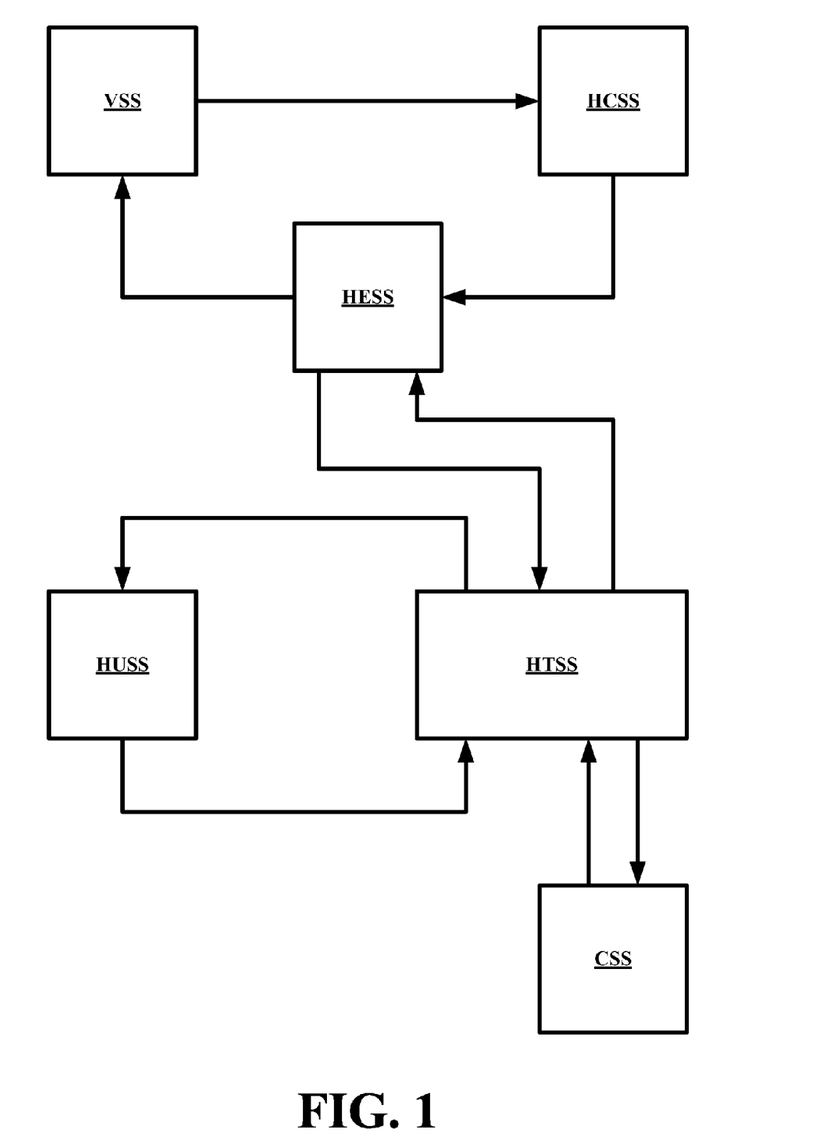
FIG. 1 depicts an embodiment of a system of the present invention.

FIG. 1A Embodiment

Referring now to FIG. 1, a conceptual flow diagram an embodiment of a system of this invention, generally CS-27, is shown to include a heat conversion subsystem HCSS, a vaporization subsystem VSS, a heat exchange and separation subsystem HESS, a heat transfer and separation subsystem HTSS, a heat utilization subsystem HUSS and a condensation subsystem CSS. The HUSS can be any subsystem that can utilized waste heat such as a factory, an refinery, an office building for heating, heating for homes, cities, towns, subdivisions or any other subsystem that can utilize a ready heat source of a low to moderate temperature.

Figure 2:
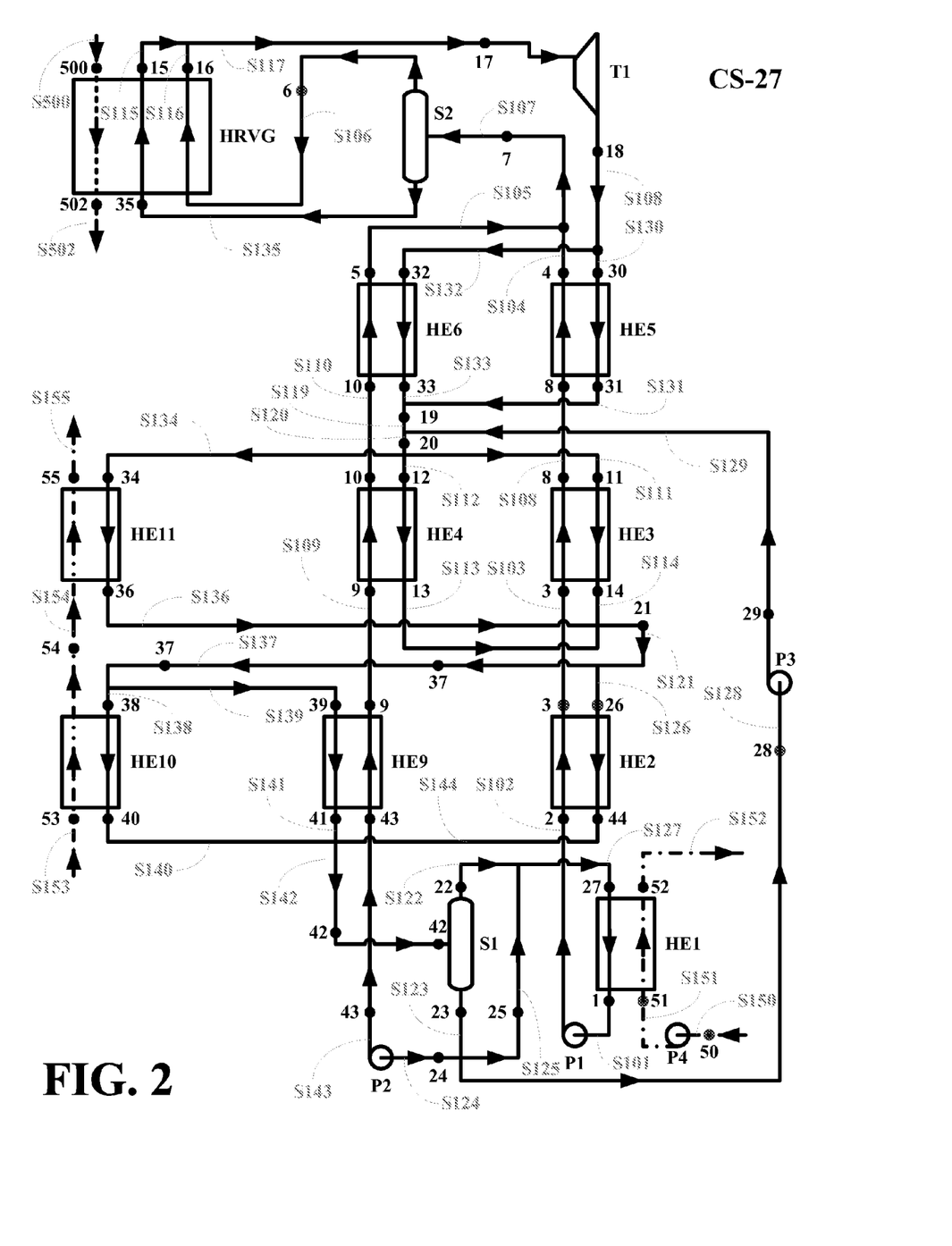
FIG. 2 depicts another embodiment of a system of the present invention.

Referring now to FIG. 2, a conceptual flow diagram an embodiment of a system of this invention, generally CS-27, is shown to include a fully condensed, multi-component rich solution stream S101 having parameters as at a point 1 enters into a feed pump P1, where it is pumped to a specified higher pressure forming a pressurized fully condensed, multi-component working fluid stream S102 having parameters as at a point 2. The stream S102 having the parameters as at the point 2 corresponds to a rich solution, i.e., a multi-component fluid mixture having a higher concentration of a lower boiling point component, than a concentration of a higher boiling point component.

The stream S102 having the parameters as at the point 2 is then sent into a preheater/heat exchanger HE2, where it is heated in counterflow by a cooled first returning condensing substream S126 having parameters as at the point 26 in a first heat exchange process 26-44 or 2-3 (as described more fully below) to form a preheated stream S103 having parameters as at a point 3 and a first partially condensed substream S144 having parameters as at a point 44. The stream S103 having the parameters as at the point 3 corresponds to or close to a state of saturated liquid, where the term close means within about 10% of a state of saturated liquid. In other embodiments, close means that the stream is within about 5% of being in the state of saturated liquid. In other embodiments, close means that the stream is within about 2.5% of being in the state of saturated liquid.

Thereafter, the preheated rich solution stream S103 having the parameters as at the point 3 passes through a recuperative boiler condenser/heat exchanger HE3. The stream S103 having the parameters as at the point 3 is heated and substantially vaporized in the recuperative boiler condenser/heat exchanger HE3 in counterflow with a first condensing solution substream S111 having parameters as at a point 11 in a second heat exchange process 11-14 or 3-8 (as described below) to form a substantially vaporized stream S108 having parameters as at a point 8 and a cooled first condensing solution substream S114 having parameters as at a point 14. The term substantially means that at least 80% of the stream has been vaporized. In certain embodiments, at least 90% of the stream has been vaporized. However, the term substantially many vary depending on the flow rates of the stream in the system. The substantially vaporized stream S108 having the parameters as at the point 8 corresponds to a state of a vapor-liquid mixture.

The substantially vaporized stream S108 having the parameters as at the point 8 is then sent into a recuperative heater/heat exchanger HE5. The stream S108 having the parameters as at the point 8 is fully vaporized and superheated in the recuperative/heat exchanger HE5 in counterflow with a first spent vapor substream or a first lower pressure superheated vapor substream S130 having parameters as at a point 30 in a third of heat exchange process 30-31 or 8-4 (as described below) to form a fully vaporized and superheated stream S104 having parameters as at a point 4 and a cooled first spent vapor substream S131 having parameters as at a point 31. The fully vaporized and superheated stream S104 having the parameters as at the point 4 corresponds to a state of superheated vapor.

Thereafter, the fully vaporized and superheated stream S104 having the parameters as at the point 4 is combined with a partially vaporized, recirculating lean solution stream S105 having parameters as at a point 5 to form a combined working solution stream S107 having parameters as at a point 7. The partially vaporized, recirculating lean solution stream S105 having parameters as at the point 5 corresponds to a multi-component mixture having a higher concentration of the higher boiling point component than the concentration of the lower boiling point component.

The combined working solution stream S107 having the parameters as at the point 7 is in a state of a liquid-vapor mixture. The stream S107 having the parameters as at the point 7 then enters into a second gravity separator S2, where it is separated into a saturated vapor stream S106 having parameters as at a point 6 and a saturated liquid stream S135 having parameters as at a point 35.

The separation of the stream S107 having the parameters as at the point 7 into the saturated vapor stream S106 having the parameters as at the point 6 and the saturated liquid stream S135 having the parameters as at the point 35 allows for an easy distribution of these two streams into multiple tubes of a Heat Recovery Vapor Generator HRVG, where the streams can be separately and collectively vaporized or vaporized and superheated.

Inside the HRVG, the saturated vapor stream S106 having the parameters as at the point 6 is superheated, while the saturated liquid stream S135 having the parameters as at the point 35 is heated, fully vaporized and superheated in counterflow by a hot flue gas stream S500 having parameters as at a point 500 in a fourth heat exchange process 500-502 or 35-15/6-16. The HRVG forms a first superheated stream S116 having parameters as at a point 16 and a second superheated stream S115 having parameters as at a point 15.

The stream S115 and S116 are then combined to form a superheated working solution vapor stream S117 having parameters as at a point 17, corresponding to a state of a higher pressure, superheated vapor.

The stream S117 having the parameters as at the point 17 is then sent into a turbine T1, where it is expanded, producing power to form a spent vapor stream or a lower pressure superheated vapor working solution stream S118 having parameters as at a point 18, corresponding to a state of a lower pressure, superheated vapor.

The stream S118 having the parameters as at the point 18 is then divided into the first spent vapor working solution substream S130 having the parameters as at the point 30 and a second spent vapor working solution substream S132 having parameters as at a point 32.

The substream S130 having the parameters as at the point 30 then passes through the heat exchanger HE5, where it is de-superheated, providing heat for the process 8-4 or 30-31, (as described above) to form the first de-superheated vapor substream S131 having the parameters as at the point 31.

Meanwhile, the substream S132 having the parameters as at the point 32 is sent into a heat exchanger HE6. In the heat exchanger HE6, the substream S132 and a heated recirculating lean solution stream S110 having parameters as at a point 10 are brought into a fifth counter-flow heat exchange process 10-5 or 32-33 to form a second de-superheated vapor working solution substream S133 having parameters as at a point 33 and the partially vaporized, recirculating lean solution stream S105 having parameters as at the point 5.

The parameters of the substream S131 having the parameters as at the point 31 and the substream S133 having the parameters as at the point 33 are practically identical, where practically identical means that the parameters are within 10% of each other. In other embodiments, the parameters are within about 5% of each other. Thereafter, the substream S131 having the parameters as at the point 31 and the substream S133 having the parameters as at the point 33 are combined to form a combined de-superheated working solution stream S119 having parameters as at a point 19.

The combined de-superheated working fluid stream S119 having the parameters as at the point 19 is in a state of slightly superheated vapor, where the term slightly superheated means that the stream is less than 10% above its boiling temperature (in certain embodiments, less than 5% above its boiling temperature). The stream S119 having the parameters as at the point 19 is then mixed with a cold pressurized recirculating lean solution stream S129 having parameters as at a point 29 to form a condensing solution stream S120 having parameters as at a point 20, which corresponds to a stream having a composition slightly leaner (slightly higher concentration of the higher boiling point component of the multi-component fluid) than the working solution composition. The term slightly means that the stream is no more than 20% leaner; in certain embodiments, no more than 10% leaner and in other embodiments, no more than 5% leaner.

The condensing solution stream S120 having the parameters as at the point 20 is then divided into the first condensing solution substream S111 having parameters as at a point 11, a second condensing solution substream S112 having parameters as at a point 12 and a third condensing solution substream S134 having parameters as at a point 34.

The first condensing solution substream S111 having the parameters as at the point 11 passes through the heat exchanger HE3, where it is partially condensed in the heat exchange process 3-8 or 11-14 (as described above) to from the stream S114 having the parameters as at the point 14. The second condensing solution substream S112 having the parameters as at the point 12 passes through a heat exchanger HE4. In the heat exchanger HE4, the second condensing solution substream S112 having the parameters as at the point 12 and a preheated recirculating lean solution stream S109 having parameters as at a point 9 are brought into a sixth counter-flow heat exchange process 9-10 or 12-13 (as described below) to form a partially condensed second condensing solution stream S113 having parameters as at a point 13 and the heated recirculating lean solution stream S110 having the parameters as at the point 10.

The third condensing solution substream S134 having the parameters as at the point 34 is sent into a water heater/heat exchanger HE11. In the heat exchanger HE11, the third condensing solution substream S134 having the parameters as at the point 34 and a preheated external water stream S154 having parameters as at a point 54 are brought into a seventh counter-flow heat exchange process 54-55 or 34-36 to form a partially condensed, third condensing solution substream S136 having parameters as at a point 36 and a heated external water stream S155 having parameters as at a point 55 comprising a co-generation of heat, while the turbine T1 co-generates electrical power or some other useable form of energy from the heat in the stream S117.

The parameters of the streams S113, S114, and S136 are substantially similar. The streams S113, S114, and S136 are then combined to form a combined condensing solution stream S121 having parameters as at a point 21. The stream S121 having the parameters as at the point 21 is then separated into a first combined condensing solution substream S126 having parameters as at a point 26 and a second combined condensing solution substream S137 having parameters as at a point 37.

The stream S126 having the parameters as at the point 26 then passes through a second heat exchanger HE2. In the heat exchanger HE2, the stream S126 having the parameters as at the point 26 and a pressurized, fully condensed rich solution stream S102 having parameters as at a point 2 are brought into a counter-flow heat exchange process 26-44 or 2-3 to form a cooled partially condensed first condensing solution stream S144 having parameters as at a point 44 and a preheated pressurized rich solution stream S103 having parameters as at a point 3.

The second combined condensing solution substream S137 having the parameters as at the point 37 is further divided into two more substreams S138 and S139 having parameters as at points 38 and 39, respectively.

The substream S138 having the parameters as at the point 38 is then sent into a water heater/heat exchanger HE10. In the heat exchanger HE10, substream S138 having the parameters as at the point 38 and an external heat absorber stream S153 having parameters as at a point 53 are brought into a counter-flow heat exchange process 53-54 or 38-40 to form the preheated external heat absorber stream S154 having the parameters as at the point 54 and cooled substream S140 having parameters as at a point 40. The preheating of the stream S153 is another part of the simultaneous cogeneration of heat and useable energy in the present system.

Meanwhile, the substream S139 having the parameters as at the point 39 passes through a heat exchanger HE9. In the heat exchanger HE9, the substream S139 having the parameters as at the point 39 and a pressurized, lean solution stream S143 having parameters as at a point 43 in a counter-flow heat exchange process 39-41 or 43-9 to form a cooled substream S141 having parameters as at a point 41 and a preheated pressurized lean solution stream S109 having parameters as at a point 9.

At this point, the streams S144, S141 and S140 having the parameters as at the points 44, 41 and 40, respectively, each have different temperatures. streams S144, S141 and S140 are then combined to form a combined condensing solution stream S142 having parameters as at a point 42.

The combined condensing solution stream S142 having the parameters as at the point 42 is then sent into a first gravity separator S1, where it is separated into a rich saturated vapor stream S122 having parameters as at point 22 and a saturated liquid lean solution stream S123 having parameters as at point 23. The saturated liquid lean solution stream S123 having the parameters as at the point 23 is then divided into three substream S124, S125 and S128 having parameters as at points 24, 25 and 28, respectively.

The stream S125 having the parameters as at the point 25 is then combined with the stream of rich saturated vapor stream S122 having the parameters as at the point 22 to form a rich solution stream S127 with parameters as at a point 27.

The stream S127 having the parameters as at the point 27 is then sent into a final condenser/heat exchanger HE1. In the final condenser/heat exchanger HE1, the stream S127 having the parameters as at the point 27 and an external coolant stream S51 having parameters as at a point 51 are brought into a counter-flow heat exchange process 51-52 or 27-1 to form a cooled and fully condensed rich solution stream S101 having parameters as at a point 1 and a heated external coolant stream S152 having parameters as at a point 52. The rich solution stream S101 having the parameters as at the point 1 corresponds to a state of fully condensed liquid (as described above.)

Meanwhile, the substream S128 having the parameters as at the point 28 is sent into a recirculating pump P3, where the substream S128 is pressurized to a pressure equal to a pressure of the substream S119 having the parameters as at the point 19 to form a pressurized, lean solution substream S129 having parameters as at a point 29. The pressurized, lean solution substream S129 having parameters as at the point 29 is then mixed with stream S119 having the parameters as at the point 19 to form the condensing solution stream S120 having parameters as at a point 20 (as described above).

At the same time, the lean solution substream S124 having the parameter as at the point 24 enters into a feed pump P2 to form the pressurized recirculating lean solution substream S143 having parameters as at the point 43 having a required higher pressure and corresponding a state of subcooled liquid. The substream S143 having the parameters as at the point 43 then passes through the heat exchanger HE9, where it is pre-heated by a condensing solution stream S139 having the parameters as at the point 39 in the heat exchange process 39-41 or 43-9 (as described above) to form the stream S109 having the parameters as at the point 9.

The recirculating lean solution stream S109 having the parameters as at the point 9 is then sent into the heat exchanger HE4, where it further heated by a condensing solution substream S112 in the heat exchange process 12-13 or 9-10 (as described above) to form the lean solution stream S110 having the parameters as at the point 10.

The lean stream S110 having the parameters as at the point 10 is then sent into the heat exchanger HE6, where it is further heated and partially vaporized by the second spent vapor working solution substream S132 having the parameters as at the point 32 in the heat exchange process 32-33 or 10-5 (as described above) to form the heated and partially vaporized lean solution stream S105 having the parameters as at the point 5. Thereafter, the heated and partially vaporized recirculating lean solution stream S105 having the parameters as at the point 5 is combined with the fully vaporized and superheated stream S104 having parameters as at the point 4 to form the working solution stream S107 having the parameters as at the point 7 (as described above.)

The heat released in the heat exchanger HE11 and HE10 by the condensing solution substream S134 having the parameters as at the point 34 and the condensing solution substream S138 having the parameters as at the point 38 in the heat exchange processes 34-36 or 54-55 and 38-40 or 53-54, respectively, to the heat absorber stream S153 (such as water or a heat transfer fluid) to form the heated heat absorber stream S155, which represents the co-generation of heat of this present invention (as described above).

The following table lists the streams of the present invention and there make up as to whether than are rich solution streams, lean solution streams, working solution streams or condensing solution streams:

TABLE 1

List of Streams and Solution Designations

| Stream | Solution |
|---|---|
| S101 | rich solution |
| S102 | rich solution |
| S103 | rich solution |
| S104 | rich solution |
| S105 | lean solution |
| S106 | vapor working solution |
| S107 | working solution |
| S108 | rich solution |
| S109 | lean solution |
| S110 | lean solution |
| S111 | condensing solution |
| S112 | condensing solution |
| S113 | condensing solution |
| S114 | condensing solution |
| S115 | liquid working solution |
| S116 | vapor working solution |
| S117 | working solution |
| S118 | working solution |
| S119 | working solution |
| S120 | condensing solution |
| S121 | condensing solution |
| S122 | vapor condensing solution |
| S123 | lean solution |
| S124 | lean solution |
| S125 | lean solution |
| S126 | condensing solution |
| S127 | rich solution |
| S128 | lean solution |
| S129 | lean solution |
| S130 | working solution |
| S131 | working solution |
| S132 | working solution |
| S133 | working solution |
| S134 | condensing solution |
| S135 | liquid working solution |
| S136 | condensing solution |
| S137 | condensing solution |
| S138 | condensing solution |
| S139 | condensing solution |
| S140 | condensing solution |
| S141 | condensing solution |
| S142 | condensing solution |
| S143 | lean solution |
| S144 | condensing solution |
| S150 | external coolant |
| S151 | external coolant |
| S152 | external coolant |
| S153 | external heat absorber |
| S154 | external heat absorber |
| S155 | external heat absorber |
| S500 | external heat source |
| S502 | external heat source |

The systems of this invention differ from systems in previous Kalex applications (U.S. patent application Ser. No. 12/259,094 filed Oct. 27, 2008) as following: in the previous system described in U.S. patent application Ser. No. 12/259,094, the quantity of recirculating lean solution is limited by the quantity of heat used for the vaporization of a rich solution stream S16 in the heat exchanger HE3 and for preheating a recirculating lean solution stream S28 in the heat exchanger HE4. In the present invention, the quantity of the recirculating lean solution can be increased to whatever extent is desired. This increase is possible because the additional heat in the returning condensing solution streams S120 and S121 having the parameters as at the points 20 and 21, respectively, is released to heat the heat absorber stream S153 in the heat exchangers HE11 and HE10 for the simultaneously co-generated heat.

Increasing the quantity of the recirculating lean solution will increase the quantity of heat output and reduce the power output as a proportion of the total output of the system. However, it should be noted that due to the fact that the recirculating lean solution is fully vaporized and passes through the turbine, producing power, before it is condensed, producing heat, increasing the heat output of the system causes only a relatively small reduction of the system's power output.

A ratio between power and heat output in the present systems is controlled by a ratio of weight-flow rates of the recirculating lean solution streams to a weight-flow rate of rich solution stream. In the system of U.S. patent application Ser. No. 12/259,094, the inlet pressure into the turbine was limited by the fact that the returning condensing streams S34 and S24 exiting heat exchangers HE3 and HE4 must have a temperature low enough that, being separated into a liquid stream S76 and a vapor stream S74, it is able to produce vapor which is at least slightly richer than the basic rich solution. This pressure limitation in turn requires a temperature of the stream S16 having the parameters as at the point 3 be lower than a temperature of the stream S72 having the parameters as at the point 21. As a result, this limits a pressure of the stream S16 having the parameters as at the point 3 and correspondingly, an inlet pressure of the stream S62 having the parameters as at the point 17 as it enters the turbine T2. However, in the present system, there is an additional heat load at temperatures which are lower than the temperature of the stream S103 having the parameters as at the point 3, i.e., in heat exchangers HE9 and HE10. Separation of the condensing solution stream S142 having the parameters as at the point 42 in the separator S1 is thus performed at a substantially lower temperature than a temperature of the stream S121 having the parameter as at the point 21. Therefore, a temperature of the stream S103 having the parameters as at the point 3 in the present system can be increased and correspondingly, this will increase the inlet pressure of the stream S117 having the parameters as at the point 17 entering the turbine T1.

However, this increase in the inlet turbine pressure is not unlimited. An initial temperature of condensation of the returning condensing stream must be higher than the temperature at which the upcoming rich solution will start to boil. The more the temperature of the stream S120 having the parameters as at the point 20 is higher than a temperature of the stream S103 having the parameters as at the point 3, the more vaporization of the rich solution is performed in a recuperative manner. Therefore, on one hand, increasing the turbine's inlet pressure increases the rate of expansion in the turbine (increasing power output), while on the other hand increasing the turbine's inlet pressure decreases the rate of recuperative boiling of the rich solution in the heat exchanger HE3; thus, reducing the over efficiency of the system. The actual inlet pressure in the turbine should be chosen as a result of optimization of output based on given boundary conditions.

For example, with a given amount of fuel of a given quality, where CS-21 would produce 10 megawatts of electrical power output, the proposed system (with a recirculation ratio of lean solution to rich solution of 3 to 1) would produce 7.51 megawatts of power and 15.55 megawatts of heat, with a thermal efficiency of 85.42%. With the same fuel, but with a recirculation ratio of 5 to 1, the present system produces 7.125 megawatts of electrical power and 17.23 megawatts of heat, with a thermal efficiency of 90.22%.

It should be noted that these high thermal efficiencies are a consequence of producing heat rather than electricity. If the present system were to produce electrical power only (at which point it would be identical to CS-21) its efficiency would be 37.1%.

It should also be noted that a conventional Rankine cycle system cogeneration plant can achieve similar high thermal efficiency, but in such a case, the ratio of electrical output to heat output would be much lower than in the present system.

Thus, for the production of a given amount of heat and electrical power, the present system would consume from about 20% to about 25% less fuel than a conventional Rankine cycle system.

Figure 3:
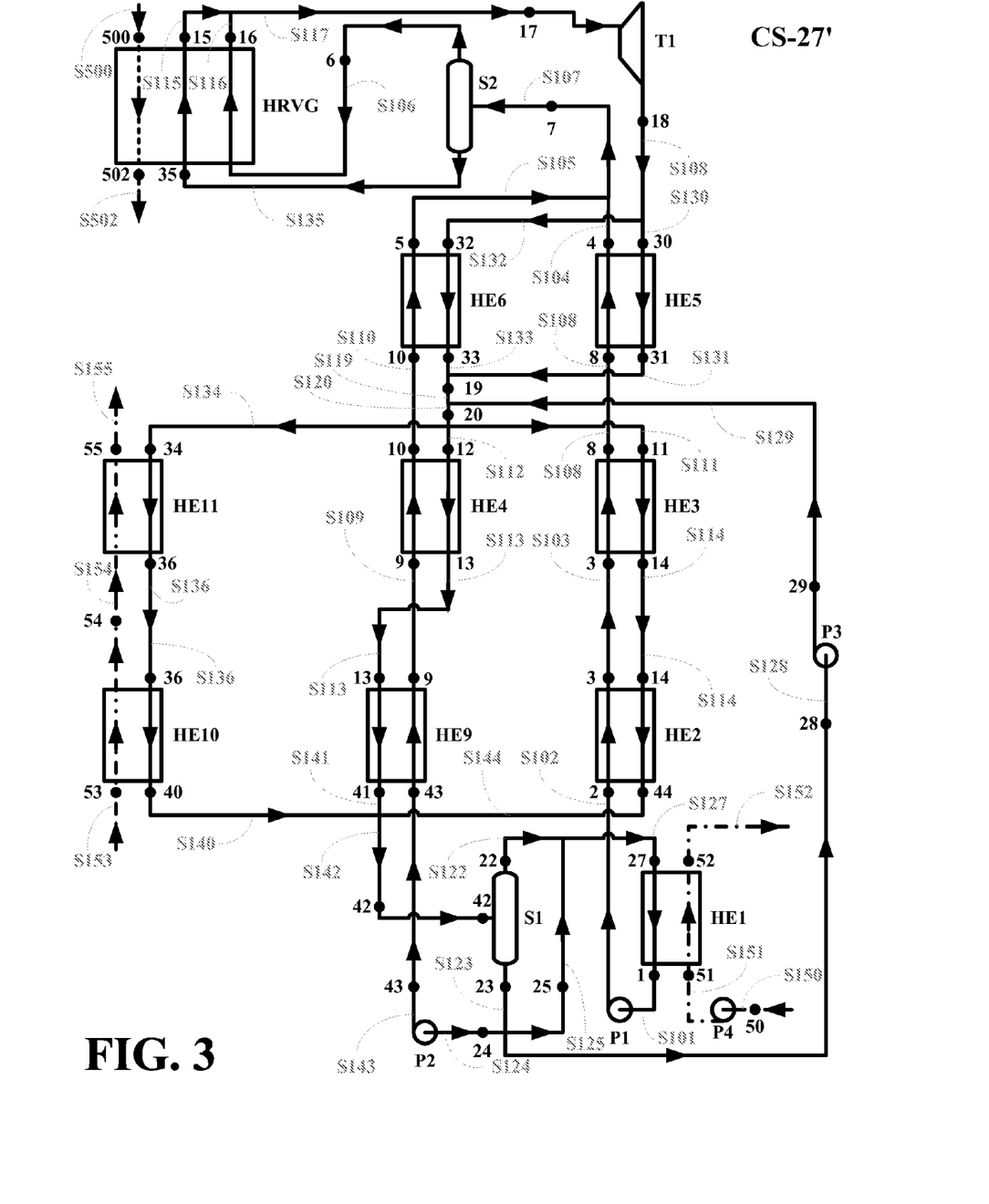
FIG. 3 depicts another embodiment of a system of the present invention.

Referring now to FIG. 3, a conceptual flow diagram an embodiment of a system of this invention, generally CS-27', is shown. In this CS-27', the three condensing solution substream S111, S112 and S134 are not combined after passing through the heat exchangers HE3, HE4 and HE11 respectively, to equalize the temperature of the substreams to form the combined stream S121 and the stream S121 is not then divided into the three condensing solution substreams S126, S138, and S139. Of course, it should be recognized that heat exchangers HE10 and HE11, HE4 and HE9 and HE3 and HE2 can be two stage heat exchangers, where the heating streams are different in the top stages and bottom stages of the two stage heat exchangers.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A system for co-generation of power and heat comprising:
   a heat conversion subsystem HCSS comprising at least one turbine, where a portion of heat of a fully vaporized and superheated working solution stream is converted to a useable form of energy or power to form a spent working solution stream,
   a vaporization subsystem VSS comprising a heat recovery and vapor generator HRVG and a mixing valve, where a vapor portion of a partially vaporized working solution substream is superheated and a liquid portion of the partially vaporized working solution substream is fully vaporized and superheated in the HRVG using heat derived from an external heat source stream and where the two superheated substreams are combined in the mixing valve to form the fully vaporized and superheated working solution stream,
   a heat exchange and separation subsystem HESS comprising a plurality of HESS heat exchange units, a HESS separator, and a plurality of valves, where the spent working solution stream is divided in a splitting valve into two spent working solution substreams, where a heated rich solution stream and a heated first lean solution substream are separately vaporized or partially vaporized in separate HESS heat exchange units using heat from the two spent working solution substreams to form a partially to fully vaporized rich solution stream, a partially vaporized first lean solution substream, and two cooled spent working solution substreams, where the two cooled spent working solution substreams are combined in a mixing valve to form a cooled spent working solution stream, where the partially to fully vaporized rich solution stream and the partially vaporized first lean solution substream are combined in a mixing value to form a mixed phase working solution steam, where the mixed phase working solution stream is separated in the HESS separator into the vapor portion of the partially vaporized working solution stream and the liquid portion of the partially vaporized working solution stream;

a heat transfer and separation subsystem HTSS comprising a plurality of HTSS heat exchange units, a HTSS separator, a plurality of pumps and a plurality of valves, where the cooled spent working solution stream is combined in a mixing valve with a second lean solution substream to form a condensing solution stream, where the condensing solution stream is divided into three condensing solution substreams in a splitting valve, where two of the condensing solution substreams are used to separately preheat and heat a pressurized first lean solution substream and to preheat and heat a pressurized fully condensed rich solution stream in the HTSS heat exchange units to form the heated rich solution substream and heated first lean solution substream and three mixed phase condensing solution substreams, where the three mixed phase condensing solution substreams are combined in a mixing valve to form a mixed phase condensing solution stream, where the mixed phase condensing solution stream is separated into a vapor stream and a lean solution stream and where the lean solution stream is divided into a first lean solution substream, a second lean solution substream and a third lean solution substream, where the first lean solution substream is passed through a pump to form a pressurized first lean solution stream, where the second lean solution substream is pass through a pump to form a pressurized second lean solution stream, and where the third lean solution substream is combined with the vapor stream to from a rich solution stream, a heat utilization subsystem HUSS comprising at least one heat exchange unit, where the third condensing solution substream is used to preheat and heat an external heat absorber stream to form a heated external heat absorber stream and where the heated external heat absorber stream supplies heat to an external process, unit or facility; and a condensation subsystem CSS comprising a condenser unit and two pumps, where the condenser fully condenses the rich solution stream to form a fully condensed rich solution stream and where the fully condensed rich solution stream is pressurized in a rich solution pump to form the pressurized fully condensed rich solution stream using a pressurized external coolant stream formed from passing an external coolant stream through a pump, where the working solution streams, the condensing solution streams, the lean solution streams and the rich solution streams are different composition of a multi-component fluid including at least one lower boiling point component and at least one higher boiling point component.

2. The system of claim 1, wherein the multi-component fluid comprises a mixture of any number of compounds having different boiling points and having favorable thermodynamic characteristics and solubilities.

3. The system of claim 1, wherein the multi-component fluid is selected from the group consisting of an ammonia-water mixture, a mixture of two or more hydrocarbons, a mixture of two or more freons, a mixture of hydrocarbons and freons, or similar fluid having two or more components having different boiling points.

4. The system of claim 1, wherein the multi-component fluid comprises a mixture of water and ammonia.

5. The system of claim 1, wherein the heat absorber fluids is selected from the group consisting of water, air, heat transfer fluids, synthetic or naturally derived hydrocarbon heat transfer fluids, silicon heat transfer fluids or any other heat transfer fluid suitable for use in the present invention.

6. The system of claim 1, where the plurality of HESS heat exchange units is two, where one HESS heat exchange unit is used to partially vaporizes the heated first lean solution substream and the second HESS heat exchange unit is used to fully or partially vaporizes heated rich solution stream.

7. The system of claim 1, where the plurality of HTSS heat exchange units is four, where two of the HTSS heat exchange units preheat and heat the pressurized first lean solution substream and two of the HTSS heat exchange units preheat and heat the pressurized rich solution stream.

8. The system of claim 1, where the plurality of HUSS heat exchange units is two, where one HUSS heat exchange unit is used to preheat the external heat absorber stream and the second HUSS heat exchange unit is used to heat the preheated external heat absorber stream.

9. A system for co-generation of power and heat comprising:
    a heat conversion subsystem HCSS comprising at least one turbine, where a portion of heat of a fully vaporized and superheated working solution stream is converted to a useable form of energy or power to form a spent working solution stream,
    a vaporization subsystem VSS comprising a heat recovery and vapor generator HRVG and a mixing valve, where a vapor portion of a partially vaporized working solution substream is superheated and a liquid portion of the partially vaporized working solution substream is fully vaporized and superheated in the HRVG using heat derived from an external heat source stream and where the two superheated substreams are combined in the mixing valve to form the fully vaporized and superheated working solution stream,
    a heat exchange and separation subsystem HESS comprising a plurality of HESS heat exchange units, a HESS separator, and a plurality of valves, where the spent working solution stream is divided in a splitting valve into two spent working solution substreams, where a heated rich solution stream and a heated first lean solution substream are separately vaporized or partially vaporized in separate HESS heat exchange units using heat from the two spent working solution substreams to form a partially to fully vaporized rich solution stream, a partially vaporized first lean solution substream, and two cooled spent working solution substreams, where the two cooled spent working solution substreams are combined in a mixing valve to form a cooled spent working solution stream, where the partially to fully vaporized rich solution stream and the partially vaporized first lean solution substream are combined in a mixing value to form a mixed phase working solution steam, where the mixed phase working solution stream is separated in the HESS separator into the vapor portion of the partially vaporized working solution stream and the liquid portion of the partially vaporized working solution stream;

a heat transfer and separation subsystem HTSS comprising a plurality of HTSS heat exchange units, a HTSS separator, a plurality of pumps and a plurality of valves, where the cooled spent working solution stream is combined in a mixing valve with a second lean solution substream to form a condensing solution stream, where the condensing solution stream is divided into three condensing solution substreams in a splitting valve, where two of the condensing solution substreams are used to separately heat a preheated first lean solution substream and a preheated rich solution stream in two of the HTSS heat exchange units to form the heated rich solution substream and heated first lean solution substream and two cooler condensing solution substream, where the three cooler condensing solution substreams are combined in a mixing valve to bring the stream into a common state and then separated in a splitting valve into three cooler condensing solution substreams, where two of the cooler condensing solution substreams are used to preheat a pressurized fully condensed rich solution stream and a pressurized first lean solution substream to form the preheated rich solution substream and preheated first lean solution substream to form two mixed phase condensing stream, where the three mixed phase condensing solution substreams are combined in a mixing valve to form a mixed phase condensing solution stream, where the mixed phase condensing solution stream is separated into a vapor stream and a lean solution stream and where the lean solution stream is divided in a splitting valve into a first lean solution substream, a second lean solution substream and a third lean solution substream, where the first lean solution substream is passed through a pump to form a pressurized first lean solution stream, where the second lean solution substream is pass through a pump to form a pressurized second lean solution stream, and where the third lean solution substream is combined with the vapor stream to from a rich solution stream, a heat utilization subsystem HUSS comprising at least one HUSS heat exchange unit, where the third cooler condensing solution substream is used to preheat an external heat absorber stream in the HUSS heat exchange unit to form a preheated external heat absorber stream, where the third condensing solution substream is used to heat the preheated external heat absorber stream and where the heated external heat absorber stream supplies heat to an external process, unit or facility; and a condensation subsystem CSS comprising a condenser unit and two pumps, where the condenser fully condenses the rich solution stream to form a fully condensed rich solution stream and where the fully condensed rich solution stream is pressurized in a rich solution pump to form the pressurized fully condensed rich solution stream using a pressurized external coolant stream formed by passing an external coolant stream through a coolant pump, where the working solution streams, the condensing solution streams, the lean solution streams and the rich solution streams are different composition of a multi-component fluid including at least one lower boiling point component and at least one higher boiling point component.

10. The system of claim 9, wherein the multi-component fluid comprises a mixture of any number of compounds having different boiling points and having favorable thermodynamic characteristics and solubilities.

11. The system of claim 9, wherein the multi-component fluid is selected from the group consisting of an ammonia-water mixture, a mixture of two or more hydrocarbons, a mixture of two or more freons, a mixture of hydrocarbons and freons, or similar fluid having two or more components having different boiling points.

12. The system of claim 9, wherein the multi-component fluid comprises a mixture of water and ammonia.

13. The system of claim 9, wherein the heat absorber fluids is selected from the group consisting of water, air, heat transfer fluids, synthetic or naturally derived hydrocarbon heat transfer fluids, silicon heat transfer fluids or any other heat transfer fluid suitable for use in the present invention.

14. The system of claim 9, where the plurality of HESS heat exchange units is two, where one HESS heat exchange unit is used to partially vaporizes the heated first lean solution substream and the second HESS heat exchange unit is used to fully or partially vaporizes heated rich solution stream.

15. The system of claim 9, where the plurality of HTSS heat exchange units is four, where two of the HTSS heat exchange units preheat and heat the pressurized first lean solution substream and two of the HTSS heat exchange units preheat and heat the pressurized rich solution stream.

16. The system of claim 9, where the plurality of HUSS heat exchange units is two, where one HUSS heat exchange unit is used to preheat the external heat absorber stream and the second HUSS heat exchange unit is used to heat the preheated external heat absorber stream.

17. A method for co-production of energy and heat comprising the steps of:
converting a portion of heat from a fully vaporized and superheated working solution stream to electrical power comprising the co-generated energy to form a spent working solution stream;
superheating a vapor portion of a mixed phase working solution stream and simultaneously fully vaporizing and superheating a liquid portion of the mixed phase working solution stream a heat recovery vapor generator to form a fully vaporized and superheated vapor portion of the working solution stream and a fully vaporized and superheated liquid portion of the working solution stream;
combining a fully vaporized and superheated vapor portion of the working solution stream and a fully vaporized and superheated liquid portion of the working solution stream to form the fully vaporized and superheated working solution stream;
heating a heated rich solution stream and a heated first lean solution substream with heat from the spent working solution stream to form a partially to fully vaporized rich solution stream and a partially vaporized lean solution substream and a cooled spent working solution stream;
combining the partially to fully vaporized rich solution stream and the partially vaporized lean solution substream into a mixed phase working solution stream;
separating the mixed phase working solution stream into the vapor portion of the mixed phase working solution stream and the liquid portion of the mixed phase working solution stream;
combining the cooled spent working solution stream with a pressurized pressure second lean solution stream to form a condensing solution stream;

heating a pressurized rich solution stream, a pressurized first lean solution substream and an external heat absorber stream with heat from the condensing solution stream to form the heated rich solution stream, the heated first lean solution substream, a heated external heat absorber stream and a mixed phase condensing solution stream, where the heated external heat absorber stream comprises the co-generated heat;

separating the mixed phase condensing solution stream into a vapor stream and a lean solution stream;

dividing the lean solution stream into a first lean solution substream, a second lean solution substream, and a third lean solution substream;

raising a pressure of the first lean solution substream to form the pressurized first lean solution substream, a pressure of the second lean solution substream to form the pressurized to form the higher pressure second lean working fluid stream;

combining the vapor stream and the third lean solution substream to form a rich solution stream;

condensing the rich solution stream with an external coolant stream to form a fully condensed rich solution stream; and raising a pressure of the fully condensed rich solution stream to form the pressurized rich solution stream, where the working solution streams, the condensing solution streams, the lean solution streams and the rich solution streams are different composition of a multi-component fluid including at least one lower boiling point component and at least one higher boiling point component.

18. The system of claim 17, wherein the multi-component fluid comprises a mixture of any number of compounds having different boiling points and having favorable thermodynamic characteristics and solubilities.

19. The system of claim 17, wherein the multi-component fluid is selected from the group consisting of an ammonia-water mixture, a mixture of two or more hydrocarbons, a mixture of two or more freons, a mixture of hydrocarbons and freons, or similar fluid having two or more components having different boiling points and wherein the heat absorber fluids is selected from the group consisting of water, air, heat transfer fluids, synthetic or naturally derived hydrocarbon heat transfer fluids, silicon heat transfer fluids or any other heat transfer fluid suitable for use in the present invention.

20. The system of claim 17, wherein the multi-component fluid comprises a mixture of water and ammonia.

* * * * *